US012808398B2

(12) United States Patent
Sarnowski

(10) Patent No.: US 12,808,398 B2
(45) Date of Patent: Nov. 24, 2026

(54) TELESCOPIC TUBE ASSEMBLY

(71) Applicant: GEM Products, LLC, Jacksonville, FL (US)

(72) Inventor: Jason Sarnowski, Jacksonville, FL (US)

(73) Assignee: GEM Products, LLC, Jacksonville, FL (US)

( * ) Notice: Subject to any disclaimer, the term of this patent is extended or adjusted under 35 U.S.C. 154(b) by 210 days.

(21) Appl. No.: 18/732,888

(22) Filed: Jun. 4, 2024

(65) Prior Publication Data

US 2025/0369472 A1 Dec. 4, 2025

(51) Int. Cl.
*F16B 7/10* (2006.01)
*F16B 7/04* (2006.01)

(52) U.S. Cl.
CPC .............. *F16B 7/105* (2013.01); *F16B 7/042* (2013.01); *Y10T 403/32524* (2015.01)

(58) Field of Classification Search
CPC ........ A01K 87/025; A46B 5/005; B25G 1/04; B25G 1/043; B25G 1/046; F16B 7/042; F16B 7/10; F16B 7/105; F16B 7/16; Y10T 403/32467; Y10T 403/32475; Y10T 403/32483; Y10T 403/32491; Y10T 403/32501; Y10T 403/32508; Y10T 403/32516; Y10T 403/32524; Y10T 403/7033; Y10T 403/7035
USPC ......... 403/109.1, 109.2, 109.3, 109.4, 109.5, 403/109.6, 109.7, 109.8, 359.5, 359.6
See application file for complete search history.

(56) References Cited

U.S. PATENT DOCUMENTS 2,476,216 A * 7/1949 Polleau .................. F16B 7/105 248/188.5
2,613,060 A * 10/1952 Trahan ...................... E21B 3/04 403/109.8
2,757,002 A * 7/1956 Ryden .................... A01K 97/00 403/109.8
3,947,141 A * 3/1976 Casset .................... A01K 87/02 403/109.8
4,247,216 A * 1/1981 Pansini .................. F16B 7/042 403/109.3

(Continued)

FOREIGN PATENT DOCUMENTS

DE 2332794 A1 * 1/1974 .............. F16B 7/105
DE 202012102457 U1 * 10/2012 .............. F16B 7/105

(Continued)

*Primary Examiner* — Josh Skroupa
(74) *Attorney, Agent, or Firm* — Taft, Stettinius & Hollister LLP

(57) ABSTRACT

A tube assembly that includes non-rotatable telescopically extendable tubes. An inner tube and an outer tube may be telescopically extendable relative to each other. The inner tube may have a groove or protrusion extending longitudinally along an exterior of the inner tube, and the outer tube may have a corresponding protrusion or groove extending longitudinally along an interior of the outer tube, where the mating engagement of the protrusion and groove prevents relative rotation of the inner and outer tubes. The tube assembly also includes a stop that prevents overextension of the tubes. The stop is formed by an increased outer diameter portion of the inner tube and a decreased inner diameter portion of the outer tube.

17 Claims, 6 Drawing Sheets

(56) References Cited

U.S. PATENT DOCUMENTS

| | | | | | |
|---|---|---|---|---|---|
| 5,622,446 | A * | 4/1997 | Hibberd | F16B 7/1427 403/109.8 |
| 6,371,686 | B1 * | 4/2002 | Wu | F16B 7/105 403/109.3 |
| 7,025,015 | B2 | 4/2006 | Wilcox et al. | |
| 7,694,431 | B2 * | 4/2010 | Tang | G01B 3/12 403/109.8 |
| 9,756,836 | B2 * | 9/2017 | Coba | B25G 3/38 |
| 11,744,354 | B2 * | 9/2023 | Xu | F16M 11/28 294/137 |
| 2024/0074420 | A1 | 3/2024 | Gravely, III et al. | |

FOREIGN PATENT DOCUMENTS

| | | | | |
|---|---|---|---|---|
| GB | 895505 | A * | 5/1962 | F16B 7/105 |
| GB | 2256035 | A * | 11/1992 | F16B 7/105 |

* cited by examiner

TELESCOPIC TUBE ASSEMBLY

TECHNICAL FIELD OF THE INVENTION

The present invention relates generally to tube assemblies. More particularly, the present invention relates to telescopically expandable tube assemblies.

BACKGROUND OF THE INVENTION

Outriggers are popular in fishing applications. Typical outriggers include rigid poles that are a part of the boats rigging and are designed to extend one or more fishing bait lines beyond the "white wash" of the water surrounding the boat. This is preferable because bait traveling through clear water—i.e., outside of the boat's "white wash"—is more likely to successfully attract a fish and catch fish. Once a fish takes the bait, the fishing line is automatically released from the outrigger and all forces caused by the fish are transferred directly to a fishing pole secured to the gunnel of the boat. At this point, a person can use the pole to reel the fish in. For example, the bait line can be connected to well-known quick release mechanisms that are adapted to release the fishing line at a preset amount of force, which then transfers the forces to the fishing pole when a fish engages the bait or otherwise pulls on the line.

Outriggers typically include several interconnectable or extensible tubes connected to each other by an interconnection device, such as clamps, adhesives, rivets, fasteners, etc. The interconnection device can secure the tubes together when the outrigger is arranged in the extended position to prevent the tubes from inadvertently collapsing upon one another, thus shortening the outrigger. Also, the interconnection device can be engaged when arranged in a collapsed position to prevent the tubes from undesirably extending, such as when traveling with or otherwise moving the outrigger.

However, current outrigger models require manual manipulation to properly align the tubes for proper engagement of the interconnection device. For example, a user must use their hands to rotate the tubes relative to each other to properly align the tubes and interconnection devices.

SUMMARY OF THE INVENTION

The present invention broadly relates to a tube assembly, such as, for example, an outrigger, that includes non-rotatable, telescopically extendable tubes. For example, an inner tube and an outer tube may be telescopically extendable relative to each other. The inner tube may include a groove or protrusion extending longitudinally along an exterior surface of the inner tube, and the outer tube may include a protrusion or groove extending longitudinally along an interior surface of the outer tube and that is adapted to respectively matingly or slidingly engage the inner tube groove or protrusion. In an example, the inner tube includes the groove and the outer tube includes the protrusion. In this example, the protrusion is matingly received in the groove and this mating engagement prevents relative rotation of the inner and outer tubes. In other examples, the inner tube may include the protrusion and the outer tube may include the groove. The tube assembly also includes a stop that prevents over-extension of the tubes relative to each other when a force is applied to the end of the assembly. The stop is formed by an increased outer diameter portion of the inner tube and a decreased inner diameter portion of the outer tube, thus causing frictional interaction when the stop is engaged.

In an embodiment, the present invention relates to a telescopic tube assembly that includes outer an inner tubes. The outer tube includes opposing first and second outer tube ends; a first outer tube portion is disposed proximal to the first outer tube end and has a first outer tube portion inner diameter; and a second outer tube portion has a second outer tube portion inner diameter that is greater than the first outer tube portion inner diameter, wherein a transition between the first and second outer tube portion inner diameters forms an outer tube stop. The inner tube is telescopically disposed in the outer tube and includes opposing first and second inner tube ends, wherein the first inner tube end is telescopically extendable out of the first outer tube end; a first inner tube portion extends to the first inner tube end and has a first inner tube portion outer diameter; and a second inner tube portion is disposed proximal to the second inner tube end and has a second inner tube portion outer diameter that is greater than the first inner tube portion outer diameter, wherein a transition between the first and second inner tube portion outer diameters forms an inner tube stop that is adapted to engage the outer tube stop to restrict the inner tube from being inadvertently removed from the first outer tube end.

In another embodiment, the present invention relates to a telescopic tube assembly that includes outer, middle, and inner tubes. The middle tube includes opposing first and second tube ends; a first middle tube portion disposed proximal to the first middle tube end and including a first middle tube portion inner diameter; a second middle tube portion disposed proximal to the second middle tube end and includes a second middle tube portion outer diameter; and a third middle tube portion disposed between the first and second middle tube portions and includes a third middle tube portion inner diameter that is greater than the first middle tube portion inner diameter, and a third middle tube portion outer diameter that is less than the second middle tube portion outer diameter.

BRIEF DESCRIPTION OF DRAWINGS

For the purpose of facilitating an understanding of the subject matter sought to be protected, there is illustrated in the accompanying drawing embodiments thereof, from an inspection of which, when considered in connection with the following description, the subject matter sought to be protected, its construction and operation, and many of its advantages, should be readily understood and appreciated.

DETAILED DESCRIPTION OF THE INVENTION

Figure 1:
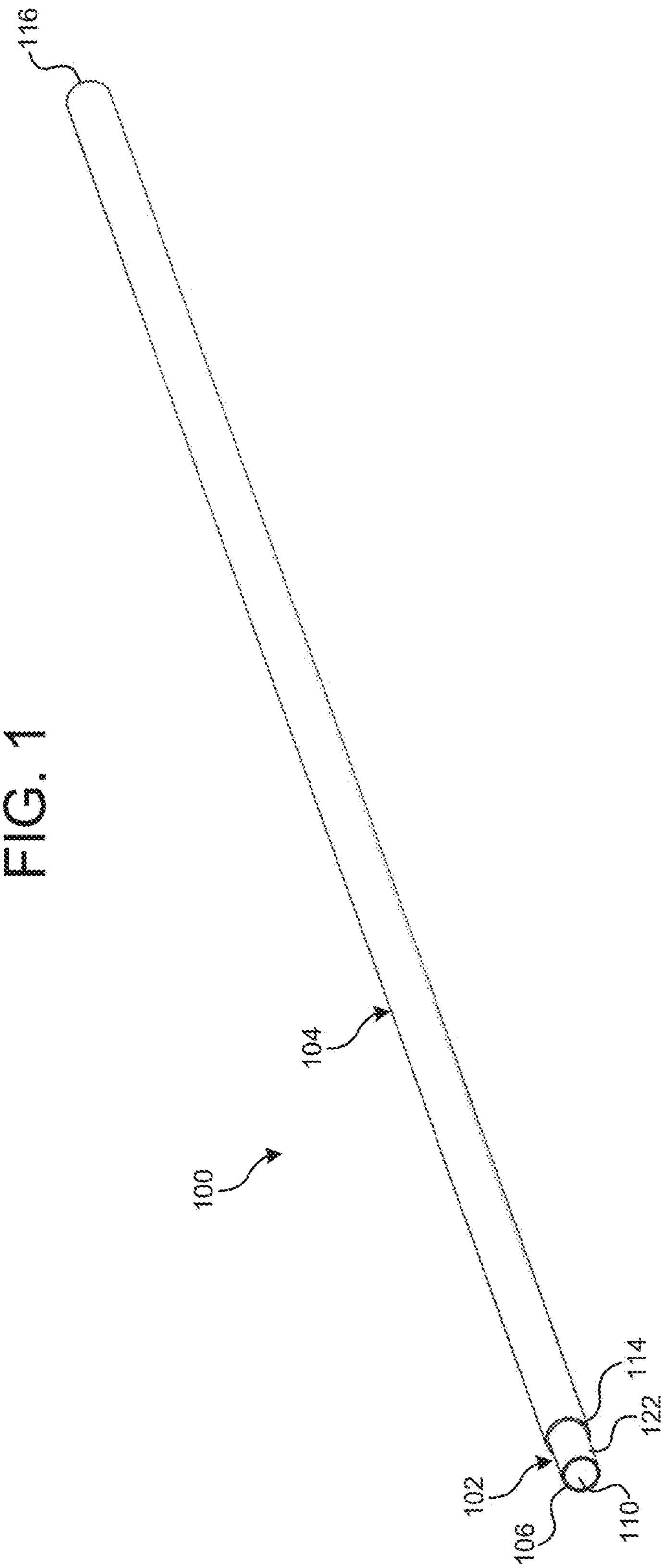
FIG. 1 is a perspective side view of an exemplar tube assembly, according to an embodiment of the invention.
Figure 3:
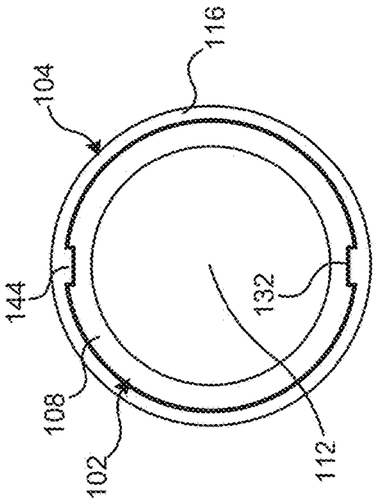
FIG. 3 is a second end view of the tube assembly of FIG. 1.
Figure 2:
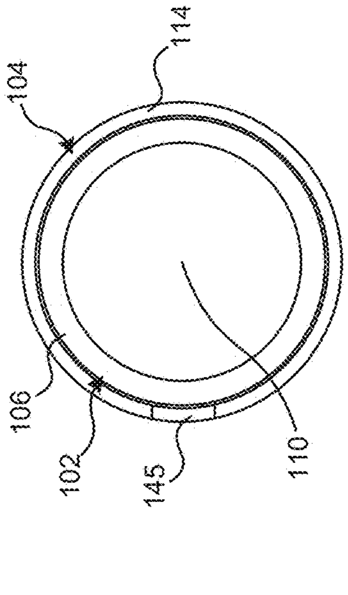
FIG. 2 is a first end view of the tube assembly of FIG. 1.
Figure 4:
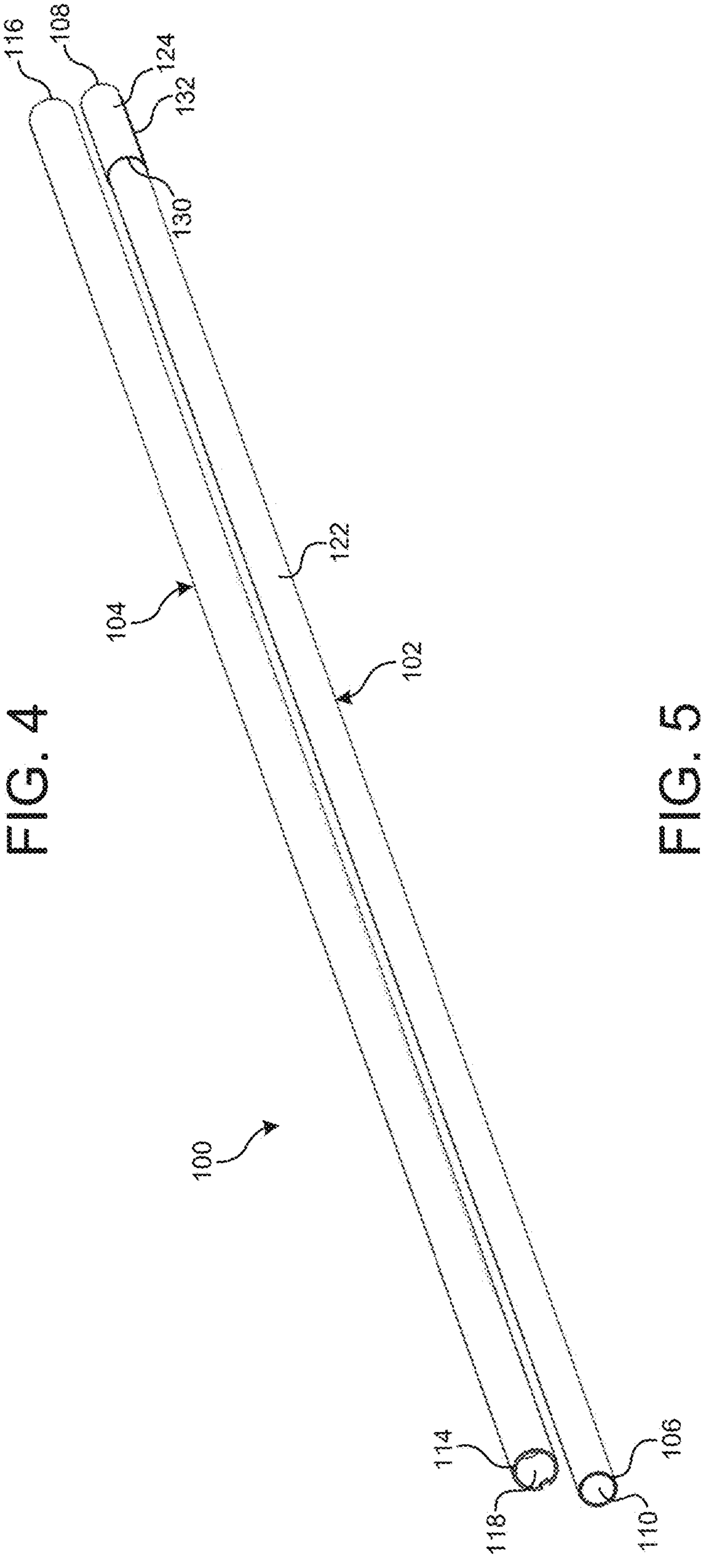
FIG. 4 is a disassembled perspective side view of the tube assembly of FIG. 1.
Figure 5:
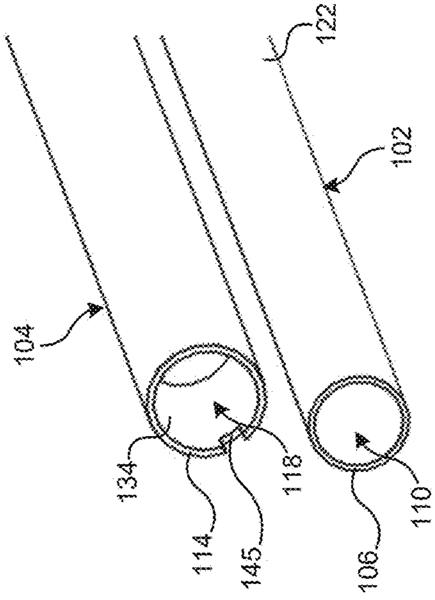
FIG. 5 is an enlarged, partial perspective side view of the first end of the tube assembly of FIG. 4.
Figure 6:
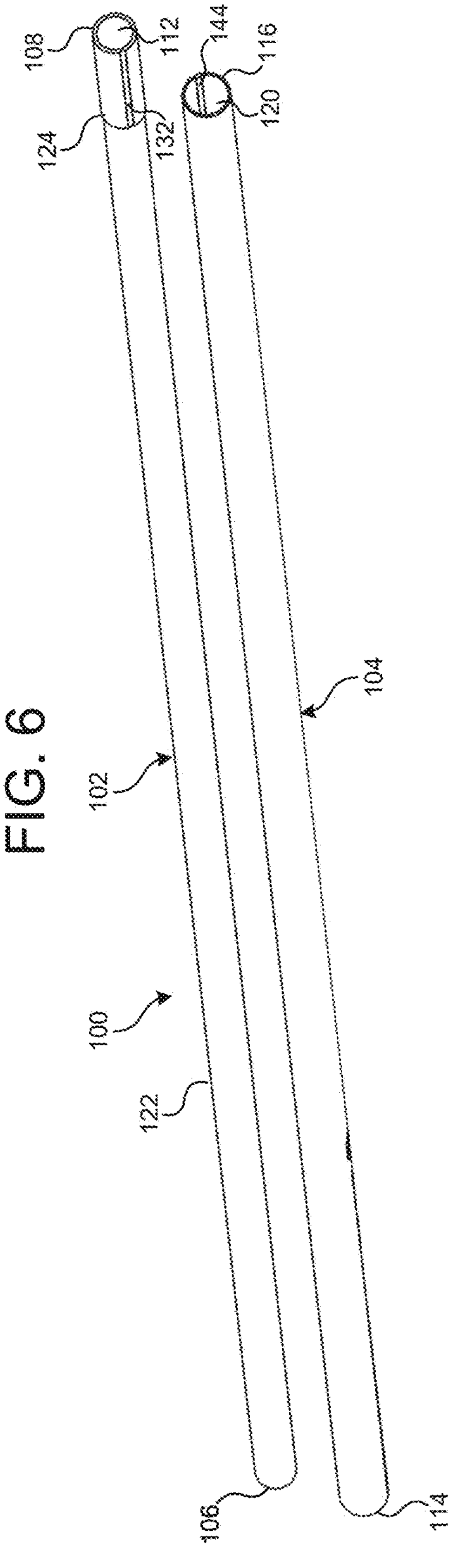
FIG. 6 is another disassembled perspective side view of the tube assembly of FIG. 1.
Figure 8:
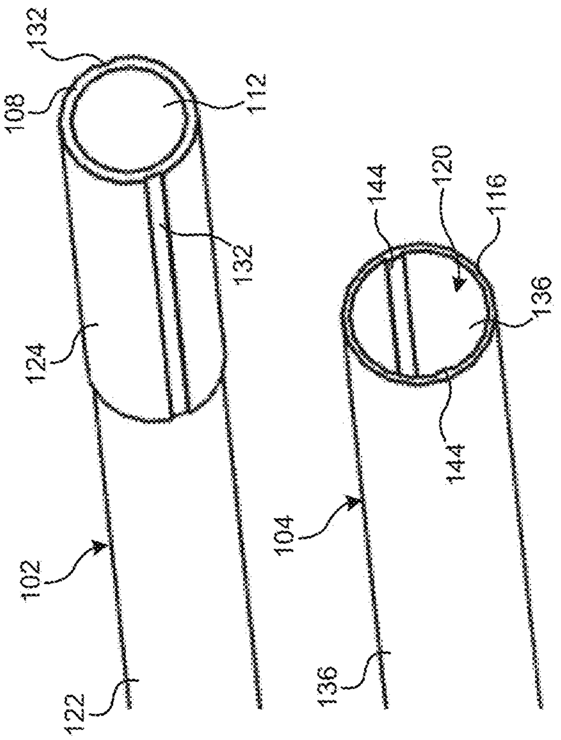
FIG. 8 is an enlarged, partial perspective side view of the second end of the tube assembly of FIG. 6.
Figure 7:
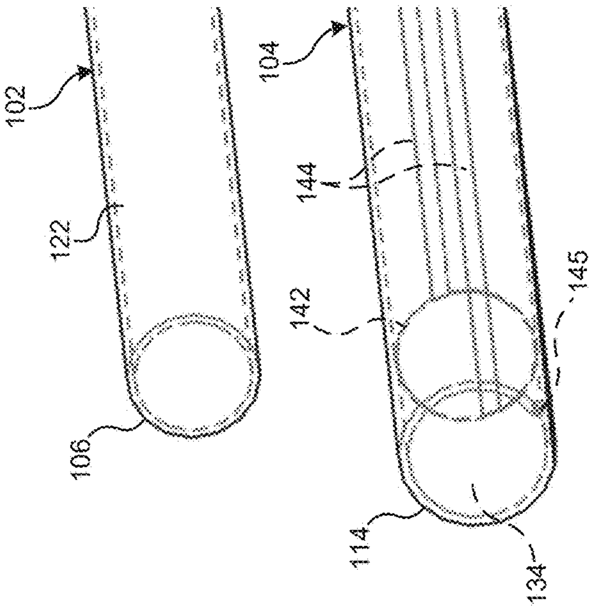
FIG. 7 is an enlarged, partial perspective side view of the first end of the tube assembly of FIG. 6, showing the interior features of the tube assembly of an embodiment of the present invention in phantom.

While the present invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention relates broadly to a tube assembly that includes non-rotatable telescopically extendable tubes, such as, for example, fishing outriggers. For example, an inner tube and an outer tube may be telescopically extendable and collapsible relative to each other. The inner tube may have a groove or protrusion extending longitudinally along an exterior surface of the inner tube, and the outer tube may have a correspondingly mating protrusion or groove extending longitudinally along an interior surface of the outer tube, which is adapted to respectively matingly engage the groove or protrusion of the inner tube. In an example, the inner tube includes a groove, and the outer tube includes a protrusion that is adapted to matingly engage the groove. In this example, the protrusion is matingly received and slidable in the groove, and this mating engagement prevents relative rotation of the inner and outer tubes while still allowing telescopic extension or collapse of the tubes. In other examples, the inner tube may include a protrusion and the outer tube may include a corresponding groove. The tube assembly may also include a stop that prevents over-extension of the tubes relative to each other when a force is applied to an end of the assembly. The stop is cooperatively formed by an increased outer diameter portion of the inner tube and a decreased inner diameter portion of the outer tube.

Referring to FIGS. 1-10, a tube assembly 100 according to an embodiment of the present invention includes first and second tubes 102, 104 (also referred to herein as inner and outer tubes, respectively) that are telescopically extendable/collapsible relative to each other. The first tube/inner tube 102 has an outer diameter that is less than an inner diameter of the outer tube, and is thus adapted to be telescopically disposed in the second tube/outer tube 104, and includes opposing first and second inner tube ends 106, 108 with respective first and second inner tube openings 110, 112. The second tube/outer tube 104 similarly is adapted to telescopically receive the first tube/inner tube 102, and includes opposing first and second outer tube ends 114, 116 with respective first and second outer tube openings 118, 120. As illustrated, to telescopically nest the first tube/inner tube 102 and the second tube/outer tube 104, the first inner tube end 106 can be disposed in or inserted into the second outer tube opening 120, and the inner tube 102 slid into or through the outer tube 104 to allow the first inner tube end 106 to extend out of the first outer tube opening 118. Thus, the first inner tube end 106 is telescopically extendable from the first outer tube end 114. The inner and outer tubes 102, 104 may also include a groove and corresponding protrusion type of mating engagement that prevents relative rotation of the inner and outer tubes 102, 104 while still allowing telescopic extension or collapse of the tubes, as described in further detail below.

Figure 10:
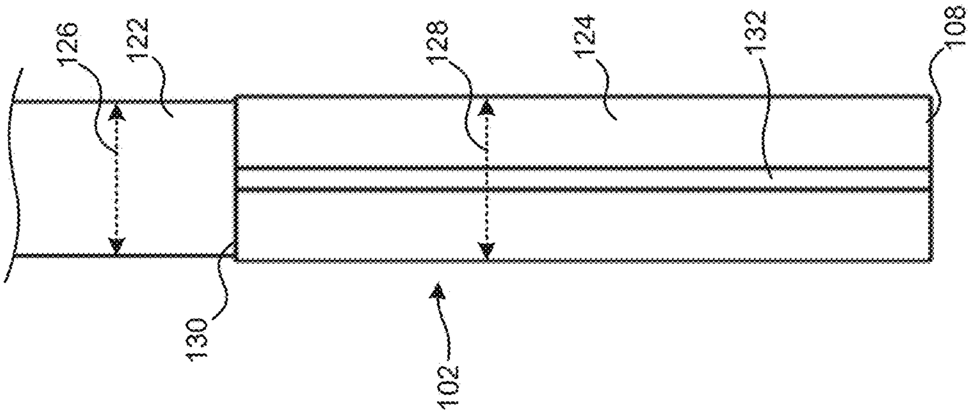
FIG. 10 is an enlarged side view of an end of an inner tube of a tube assembly, according to an embodiment of the invention.

The inner tube 102 also includes first and second inner tube portions 122, 124 respectively having first and second inner tube portion outer diameters 126, 128 (as shown in FIG. 10). As shown in FIG. 10, the first inner tube portion outer diameter 126 is less than the second inner tube portion outer diameter 128. Said another way, the second inner tube portion outer diameter 128 is greater than the first inner tube portion outer diameter 126. A first stop 130 (or inner tube stop) may be formed at a transition between the first and second inner tube portion outer diameters 126, 128. The first inner tube portion 122 may make up a majority of a length of the inner tube 102, and extend to the first inner tube end 106. The second inner tube portion 124 may make up a minority of the length of the inner tube 102, and be disposed proximal to the second inner tube end 108.

The second inner tube portion 124 may also include one or more grooves 132 extending longitudinally along at least a portion of an exterior surface of the second inner tube portion 124. As shown, the one or more grooves 132 includes two grooves that are diametrically opposed to one another. However, it should be appreciated that any number of longitudinal grooves 130 can be used, such as one, two, three, four, etc.

Figure 9:
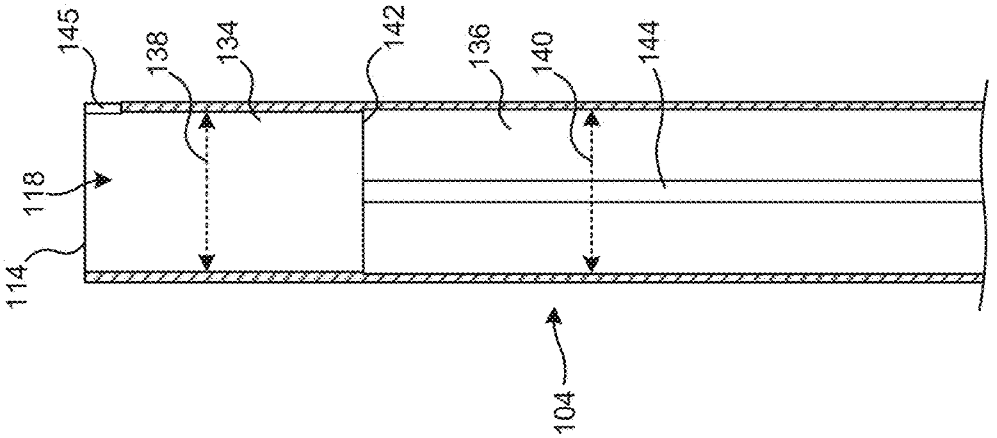
FIG. 9 is a cross-sectional view of an end of an outer tube of a tube assembly, according to an embodiment of the invention.
Figure 11:
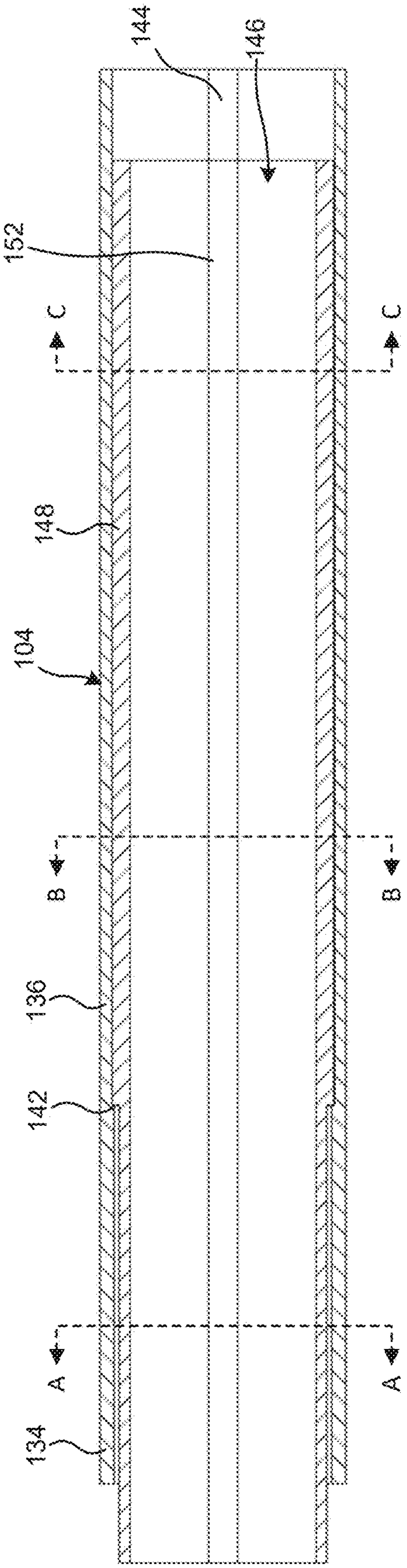
FIG. 11 is a cross-sectional view of another exemplar tube assembly, according to an embodiment of the invention.
Figure 12:
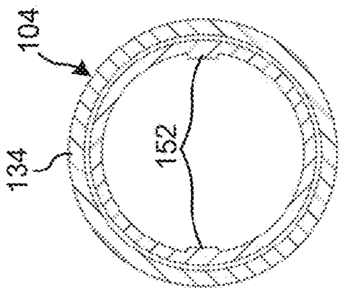
FIG. 12 is a cross-sectional view of the tube assembly, taken alone line A-A of FIG. 11.
Figure 13:
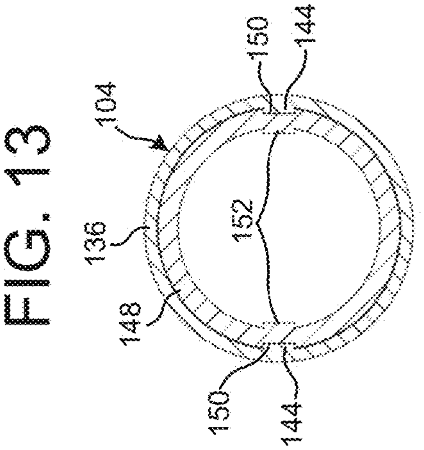
FIG. 13 is a cross-sectional view of the tube assembly, taken alone line B-B of FIG. 11.
Figure 14:
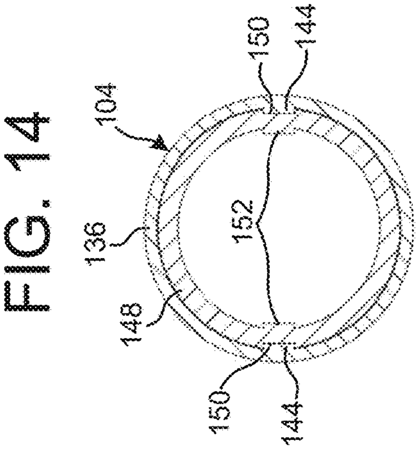
FIG. 14 is a cross-sectional view of the tube assembly, taken alone line C-C of FIG. 11.

The outer tube 104 also includes first and second outer tube portions 134, 136 respectively having first and second outer tube portion inner diameters 138, 140 (as shown in FIG. 9). As shown in FIG. 9, the first outer tube portion inner diameter 138 is less than the second outer tube portion inner diameter 140. Said another way, the second outer tube portion inner diameter 140 is greater than the first outer tube portion inner diameter 138. A second stop 142 (or outer tube stop) may be formed at a transition between the first and second outer tube portion inner diameters 138, 140. The second outer tube portion 136 may make up a majority of a length of the outer tube 104, and extend to the second outer tube end 116. The first outer tube portion 134 may make up a minority of the length of the outer tube 104, and be disposed proximal to the first outer tube end 114.

The second outer tube portion 136 may also include one or more inwardly extending protrusions 144 extending longitudinally along at least a portion of an interior surface of the second outer tube portion 136. As shown, the one or more protrusions 144 includes two protrusions that are diametrically opposed to one another. However, it should be appreciated that any number of protrusions 144 can be used, such as one, two, three, four, etc.

When the inner and outer tubes 102, 104 are telescopically nested together, the one or more inwardly extending protrusions 144 are matingly and slidably received in the corresponding one or more grooves 132 to restrict relative rotation of the inner and outer tubes 102, 104. The first and second stops 130, 142 also abut one another to restrict the inner tube 102 from being removed from the outer tube 104 via the first outer tube end 114.

For example, to telescopically nest the first tube/inner tube 102 and the second tube/outer tube 104, the first inner tube end 106 can be disposed in or inserted into the second outer tube opening 120, and the inner tube 102 slid into the outer tube 104. When the second inner tube portion 124 is to be inserted into the second outer tube opening 120, the one or more grooves 132 are aligned with the one or more corresponding inwardly extending protrusions 144, such that the one or more inwardly extending protrusions 144 are matingly and slidably received in the corresponding one or more grooves 132.

The inner tube 102 can be telescopically extended out of the first outer tube opening 118 at the first outer tube end 114 by a force pulling the inner tube 102 outwardly relative to the outer tube 104. As the inner tube 102 is slid out of the first outer tube opening 118 at the first outer tube end 114, the one or more grooves 132 slide longitudinally along the corresponding one or more inwardly extending protrusions 144. Further, when the inner tube 102 is telescopically extended out of the outer tube 104 to a maximum extension, the first and second stops 130, 142 abut one another to restrict the inner tube 102 from being removed from the outer tube 104 via the first outer tube opening 118 at the first outer tube end 114. Thus, the tube assembly includes non-rotatable telescopically extendable tubes.

The outer tube 104 may also be adapted to be coupled to another component and/or include one or more attachment points or features to allow for the inner tube 102 to be telescopically locked with respect to the outer tube 104. For example, the outer tube 104 may include a cut-out 145 disposed proximal to the first outer tube end 114 that is adapted for use in coupling to another component and/or telescopically locking the inner tube 102 relative to the outer tube 104.

While the one or more grooves 132 and corresponding protrusions 144 are illustrated as extending in linear manner, the one or more grooves 132 and corresponding protrusions 144 may be curved or extend an a non-zero angle. The curve/non-zero angle of the one or more grooves 132 and corresponding protrusions 144 can be selected to provide for a controlled rotation of the inner tube 102 relative to the outer tube 104 as the inner tube 102 is extended from the outer tube 104. This can provide for a desired rotational alignment of the inner and outer tubes 102, 104 relative to each other.

While the inner tube 102 is described as including the one or more grooves 132 and the outer tube 104 is described as including the corresponding one or more protrusions 144, it will be appreciated that these structures could be reversed. For example, the inner tube 102 may include one or more outwardly extending protrusions and the outer tube may include corresponding one or more grooves adapted to matingly and slidably receive the protrusions.

Further, while the tube assembly is described as including two tubes, the tube assembly may include any number of telescopic tubes. For example, one or more middle tubes may be included. As an example, a middle tube may include the features of the inner tube 102 as well as the features of the outer tube 104. For example, the middle tube may include opposing first and second middle tube ends, a first middle tube portion disposed proximal to the first middle tube end, a second middle tube portion disposed proximal to the second middle tube end, and a third middle tube portion disposed between the first and second middle tube portions. The first middle tube portion may include an area of reduced inner diameter, similar to the first outer tube portion 134 described above, to provide a stop and restrict an inner tube from being inadvertently removed from the middle tube. Thus, the first middle tube portion may have a first middle tube portion inner diameter that is less than a third middle tube portion inner diameter of the third middle tube portion. The second middle tube portion may include an area of increased outer diameter, similar to the second inner tube portion 124 described above, to provide another stop and restrict the middle tube from being inadvertently removed from the outer tube. Thus, the second middle tube portion may have a second middle tube portion outer diameter that is greater than a third middle tube portion outer diameter of the third middle tube portion. Said another way, the third middle tube portion inner diameter is greater than the first middle tube portion inner diameter, and the third middle tube portion outer diameter is less than the second middle tube portion outer diameter.

For example, referring to FIGS. 11-14, a middle tube 146 includes a second middle tube portion 148 with one or more grooves 150, similar to the second inner tube portion 124 and one or more grooves 132 described above. In this respect, the middle tube 146 may be non-rotatable and telescopically extendable relative to an outer tube, such as the outer tube 104 described above. Further, the middle tube 146 may also include one or more inwardly extending protrusions 152 (similar to the one or more protrusions 144 described above) adapted to correspondingly mate with grooves of an inner tube (similar to the inner tube 102 described above) adapted to be telescopically disposed in the middle tube 146. The one or more inwardly extending protrusions 152 may extend longitudinally along a substantial length of the middle tube or longitudinally along a length of the second and third middle tube portions. Further, the middle tube 146 may include a first middle tube portion, similar to the first outer tube portion 134 described above, to provide a stop and restrict the inner tube from being inadvertently removed from the middle tube 146.

It will also be appreciated that any number of middle tubes could be used to provide a desired tube assembly configuration.

The various embodiments of tube assemblies described herein may be used in any context, including, but not limited to, use in outriggers. The tube assemblies may also be used in conjunction with other outrigger components, including, but not limited to, the outrigger mount described in U.S. Pat. No. 9,625,087, and/or the outrigger clamps described in U.S. Pat. Nos. 10,575,512, 10,337,547, and 10,470,451.

The various embodiments of tube assemblies described herein may also be adapted to be used as an accessory pole that can be coupled to various accessories, such as a gaff hook, a landing net, a cleaning brush, a mop, or other types of accessories. In an example, an accessory may be fixedly coupled to the first inner tube end of the inner tube, such as via bonding, welding, monolithically formed with the first inner tube end, or other type of fixed coupling. In another example, an accessory may be removably coupled to the first inner tube end of the inner tube, such as via a spring pin type of coupling, or other type of coupling that allows for the accessory to be removed.

Figure 15:
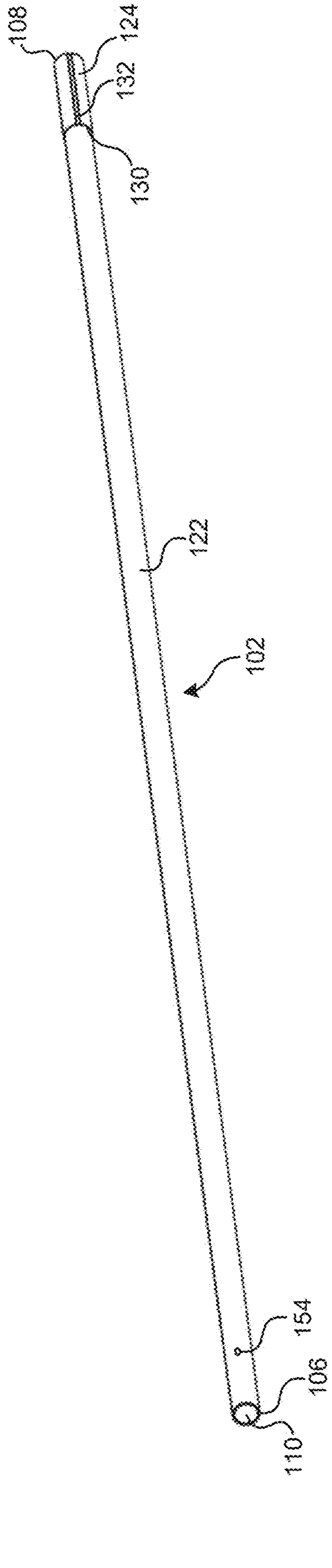
FIG. 15 is a perspective side view of an exemplar inner tube of a tube assembly, according to an embodiment of the invention.
Figure 16:
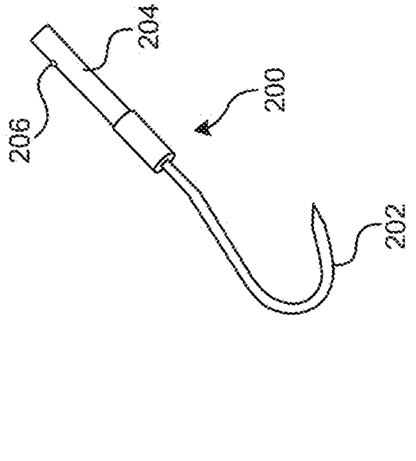
FIG. 16 is a perspective side view of an exemplar gaff hook accessory for the tube assembly, according to an embodiment of the invention.

For example, referring to FIG. 15, the inner tube 102 may include an aperture 154 proximal to the first inner tube end 106 that is adapted to receive a spring pin of an accessory to removably couple the accessory to the first inner tube end 106 of the inner tube 102. FIGS. 16-19 illustrate a few exemplar interchangeable accessories that may be coupled to the first inner tube end 106 of the inner tube 102. FIG. 16 illustrates a gaff hook 200 including a hook 202 coupled to a shaft 204 with a spring pin 206. The shaft 204 may be inserted into the first inner tube opening 110 with the spring pin 206 depressed, and when the spring pin 206 is aligned with the aperture 154, the spring pin 206 extends through the aperture 154 to couple the gaff hook 200 to the inner tube 102. The gaff hook 200 may also be removed from the inner tube 102 by depressing the spring pin 206 into the aperture 154 and applying a force pulling the shaft 204 of the gaff hook 200 out of the first inner tube opening 110.

Figure 17:
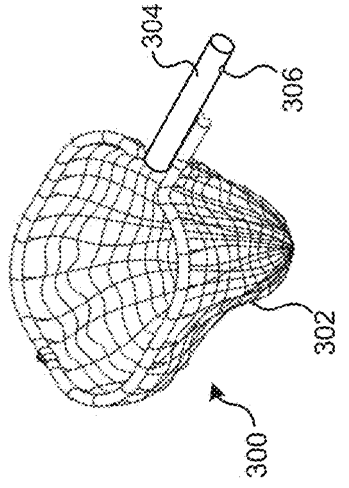
FIG. 17 is a perspective side view of an exemplar landing net accessory for the tube assembly, according to an embodiment of the invention.

FIG. 17 illustrates a landing net 300 including a net portion 302 coupled to a shaft 304 with a spring pin 306. In a similar manner as described above with respect to the gaff hook 200, the shaft 304 of the landing net 300 may be inserted into the first inner tube opening 110 with the spring pin 306 depressed, and when the spring pin 306 is aligned with the aperture 154, the spring pin 306 extends through the aperture 154 to couple the landing net 300 to the inner tube 102. The landing net 300 may also be removed from the inner tube 102 by depressing the spring pin 306 into the aperture 154 and applying a force pulling the shaft 304 of the landing net 300 out of the first inner tube opening 110.

Figure 18:
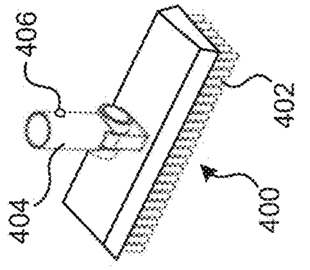
FIG. 18 is a perspective side view of an exemplar cleaning brush accessory for the tube assembly, according to an embodiment of the invention.

FIG. 18 illustrates a cleaning brush 400 including a brush head with bristles 402 coupled to a shaft 404 with a spring pin 406. In a similar manner as described above with respect to the gaff hook 200, the shaft 404 of the cleaning brush 400 may be inserted into the first inner tube opening 110 with the spring pin 406 depressed, and when the spring pin 406 is aligned with the aperture 154, the spring pin 406 extends through the aperture 154 to couple the cleaning brush 400 to the inner tube 102. The cleaning brush 400 may also be removed from the inner tube 102 by depressing the spring pin 406 into the aperture 154 and applying a force pulling the shaft 404 of the cleaning brush 400 out of the first inner tube opening 110.

Figure 19:
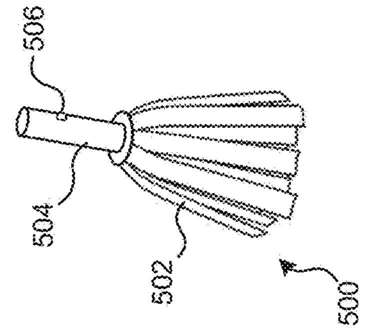
FIG. 19 is a perspective side view of an exemplar cleaning mop accessory for the tube assembly, according to an embodiment of the invention.

FIG. 19 illustrates a mop 500 including a mop head 502 coupled to a shaft 504 with a spring pin 506. In a similar manner as described above with respect to the gaff hook 200, the shaft 504 of the mop 500 may be inserted into the first inner tube opening 110 with the spring pin 506 depressed, and when the spring pin 506 is aligned with the aperture 154, the spring pin 506 extends through the aperture 154 to couple the mop 500 to the inner tube 102. The mop 500 may also be removed from the inner tube 102 by depressing the spring pin 506 into the aperture 154 and applying a force pulling the shaft 504 of the mop 500 out of the first inner tube opening 110.

When the tube assembly is used as an accessory pole with one of a number of interchangeable accessories, the groove and corresponding protrusion type of mating engagement between the inner and outer tubes (or between the inner, middle, and outer tubes) prevents relative rotation of the tubes while still allowing telescopic extension or collapse of the tubes, as described above. This is allows a user to apply a rotational type of torque via the tube assembly to the accessory without the tubes inadvertently rotating relative to one another. Further, the stop features described above, prevent the tubes from being overextended and/or inadvertently separated relative to one another. This allows a user to apply a pulling type of force via the tube assembly without the tubes inadvertently separating relative to one another.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical or magnetic, or chemical connection (such as via chemical bonding, adhesives, epoxies, etc.) between two or more objects, features, work pieces, and/or environmental matter. "Coupled" is also intended to mean, in some examples, one object being integral, integrally formed, or monolithic with another object. As used herein, the term "a" or "one" may include one or more items unless specifically stated otherwise.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A telescopic tube assembly, comprising:

an outer tube including:

opposing first and second outer tube ends;

a first outer tube portion disposed proximal to the first outer tube end and having a first outer tube portion inner diameter;

a second outer tube portion having an interior surface and a second outer tube portion inner diameter that is greater than the first outer tube portion inner diameter, wherein a transition between the first and second outer tube portion inner diameters forms an outer tube stop; and an inwardly extending protrusion extending longitudinally along at least a portion of the interior surface of the second outer tube portion, wherein the inwardly extending protrusion is separate from the first outer tube portion inner diameter; and an inner tube telescopically disposed in the outer tube and including:

opposing first and second inner tube ends, wherein the first inner tube end is telescopically extendable out of the first outer tube end;

a first inner tube portion extending to the first inner tube end and having a first inner tube portion outer diameter; and a second inner tube portion disposed proximal to the second inner tube end and having a second inner tube portion outer diameter that is greater than the first inner tube portion outer diameter, wherein a transition between the first and second inner tube portion outer diameters forms an inner tube stop that is adapted to abut the outer tube stop.

2. The telescopic tube assembly of claim 1, wherein the inner tube further includes a groove adapted to correspondingly receive the protrusion and restrict relative rotation of the inner and outer tubes.

3. The telescopic tube assembly of claim 2, wherein the groove extends longitudinally along at least a portion of an exterior surface of the second inner tube portion.

4. The telescopic tube assembly of claim 3, wherein the protrusion includes a number of protrusions.

5. The telescopic tube assembly of claim 4, wherein the groove includes a number of grooves corresponding to the number of protrusions.

6. The telescopic tube assembly of claim 1, wherein the inner tube further includes an aperture proximal to the first inner tube end, wherein the aperture is adapted to receive a pin of an accessory to couple the accessory to the inner tube.

7. A telescopic tube assembly, comprising:

an outer tube;

a middle tube telescopically disposed in the outer tube; and an inner tube telescopically disposed in the middle tube, wherein the middle tube includes:

opposing first and second tube ends;

a first middle tube portion disposed proximal to the first middle tube end and including a first middle tube portion inner diameter;

a second middle tube portion disposed proximal to the second middle tube end and include a second middle tube portion outer diameter;

a third middle tube portion disposed between the first and second middle tube portions and including a third middle tube portion inner diameter that is greater than the first middle tube portion inner diameter, and a third middle tube portion outer diameter that is less than the second middle tube portion outer diameter; and an inwardly extending protrusion extending longitudinally along at least a portion of an interior surface of at least one of the first, second, and third middle tube portions, wherein the inwardly extending protrusion is separate from the first middle tube portion inner diameter.

8. The telescopic tube assembly of claim 7, wherein the outer tube includes opposing first and second outer tube ends, a first outer tube portion disposed proximal to the first outer tube end and having a first outer tube portion inner diameter, and a second outer tube portion having a second outer tube portion inner diameter that is greater than the first outer tube portion inner diameter.

9. The telescopic tube assembly of claim 7, wherein the inner tube includes opposing first and second inner tube ends, a first inner tube portion extending to the first inner tube end and having a first inner tube portion outer diameter, and a second inner tube portion disposed proximal to the second inner tube end and having a second inner tube portion outer diameter that is greater than the first inner tube portion outer diameter.

10. The telescopic tube assembly of claim 7, wherein the inner tube further includes a groove adapted to receive the protrusion and restrict rotation of the inner and middle tubes with respect to each other.

11. The telescopic tube assembly of claim 10, wherein the protrusion includes a number of protrusions.

12. The telescopic tube assembly of claim 11, wherein the groove includes a number of grooves corresponding to the number of protrusions.

13. The telescopic tube assembly of claim 7, wherein the outer tube includes an inwardly extending protrusion.

14. The telescopic tube assembly of claim 13, wherein the middle tube further includes a groove adapted to receive the protrusion and restrict relative rotation of the outer and middle tubes.

15. The telescopic tube assembly of claim 14, wherein the protrusion includes a number of protrusions.

16. The telescopic tube assembly of claim 15, wherein the groove includes a number of grooves corresponding to the number of protrusions.

17. The telescopic tube assembly of claim 7, wherein the inner tube further includes an aperture proximal to the first inner tube end, wherein the aperture is adapted to receive a pin of an accessory to couple the accessory to the inner tube.

* * * * *